R. L. WILCOX.
METHOD AND DIE FOR TRIMMING BLANKS.
APPLICATION FILED FEB. 26, 1918.
1,294,989.
Patented Feb. 18, 1919.
2 SHEETS—SHEET 1.
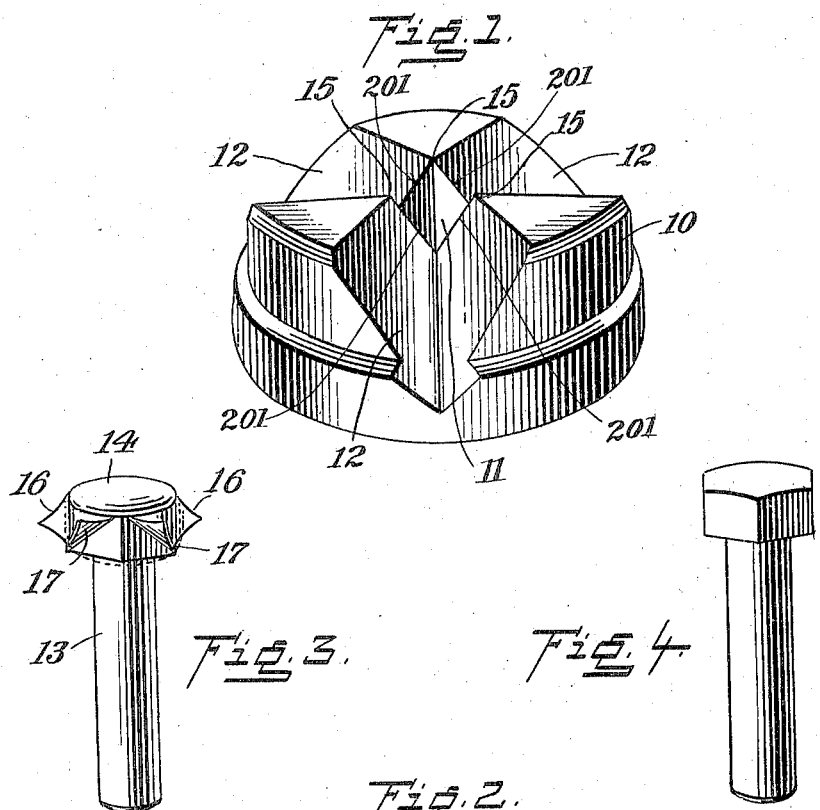
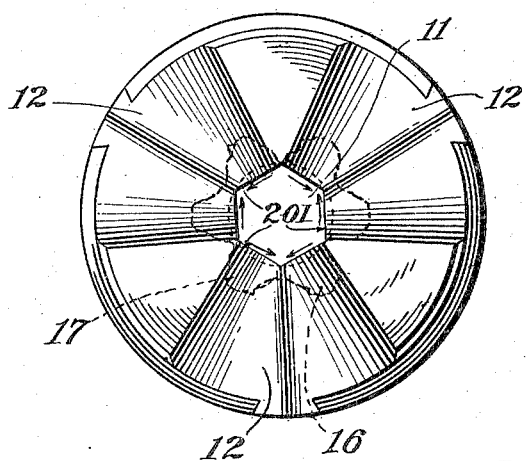
INVENTOR:
RICHARD LESTER WILCOX
by George E. Hall
Atty.

R. L. WILCOX.
METHOD AND DIE FOR TRIMMING BLANKS.
APPLICATION FILED FEB. 26, 1918.
1,294,989.
Patented Feb. 18, 1919.
2 SHEETS—SHEET 2.
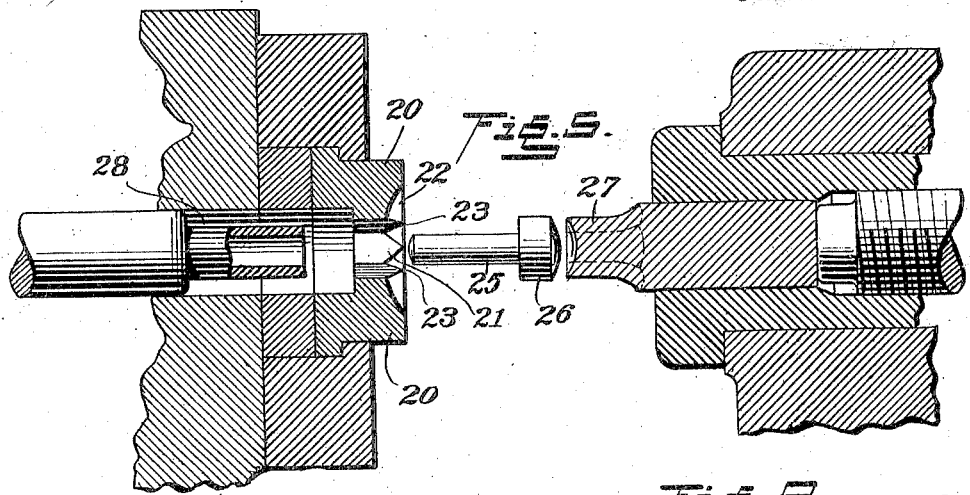
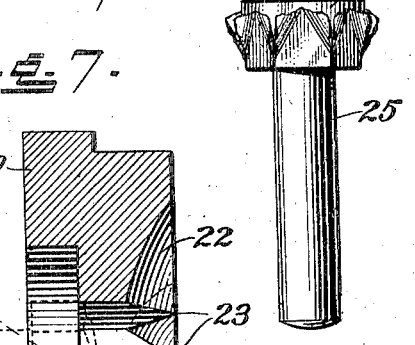
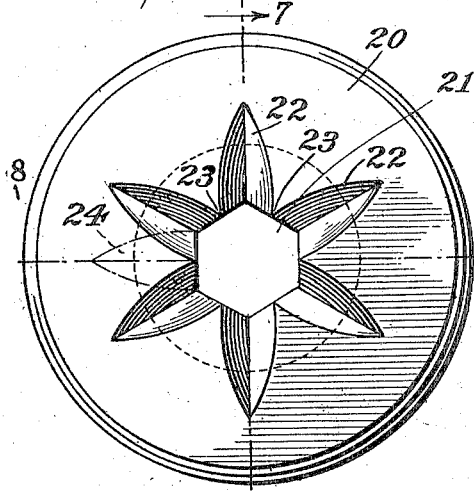
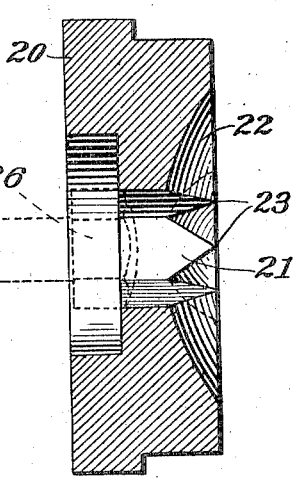
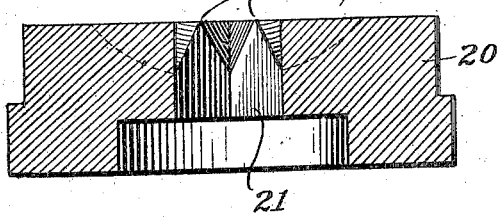
INVENTOR:
RICHARD LESTER WILCOX
by George E. Hall Atty.

UNITED STATES PATENT OFFICE.

RICHARD LESTER WILCOX, OF WATERBURY, CONNECTICUT, ASSIGNOR TO THE WATERBURY FARREL FOUNDRY AND MACHINE COMPANY, OF WATERBURY, CONNECTICUT, A CORPORATION OF CONNECTICUT.

METHOD AND DIE FOR TRIMMING BLANKS.

1,294,989.　　　Specification of Letters Patent.　　Patented Feb. 18, 1919.

Application filed February 26, 1918.　Serial No. 219,172.

*To all whom it may concern:*

Be it known that I, RICHARD LESTER WILCOX, a citizen of the United States, and a resident of Waterbury, county of New Haven, State of Connecticut, have invented certain new and useful Improvements in Methods and Dies for Trimming Blanks, of which the following is a specification.

My invention relates more especially to methods and apparatus by which a blank can be given a polygonal cross section, such as the square, hexagonal or octagonal shapes of bolt heads, nuts and the like, or a many-sided shape of any kind, such, for instance, as a circular section with flat sides, as is formed on shackle bolts and the like. It will be understood that by "polygonal" or "polygon" I mean any such shape. A blank may also be cut so as to have a circular section, and when I refer hereinafter to a "trimmed" section, it will be understood that I mean a section of any shape which has been cut or trimmed by the dies, either entirely around it or on any particular portion.

One of the objects of my invention, among others, is to minimize the amount of energy necessary in trimming a blank to give it a trimmed cross section, while at the same time producing a finished product which will have smooth faces, and, if a polygonal section is formed, with the edges between the the faces sharply defined.

Another object of my invention is to produce a simplified and yet reliable form of die which can be readily sharpened and yet which will be very rigid and capable of standing great strains and will require no relative adjustments between the cutting edges.

As the trimming of both heads and nuts has heretofore usually been carried out, the blank has been forced through a die having a suitably shaped opening therein, in such a way that the cutting edges of the die enter the blank by cutting for a short distance and then, the resistance to the cutting pressure having been sufficiently decreased, the remaining metal is practically torn from the blank, leaving the faces of the blank rough and in most cases, with depressions below what should be the level of the face. For some classes of work, the bolts or nuts thus formed are undesirable because of their unsightly and unfinished appearance.

I have found that polygonal blanks with a very superior finish on the faces may be produced with a minimum amount of force applied to the cutting tools if each face is cut angularly so as to remove the metal on that face with a shearing stroke and preferably so that each face is cut completely by such an angular cut in such a way as to throw the chip on each face toward the chip being formed by the cutting on an adjacent face.

The annexed drawings illustrate some of the many forms of dies with which my novel method may be carried out.

In the drawings, Figure 1 represents one form of die in perspective;

Fig. 2 represents a plan view of the die shown in Fig. 1;

Fig. 3 represents a blank partially cut in the die shown in Figs. 1 and 2; and Fig. 4 the completed article;

Fig. 5 represents another form of die together with the support therefor, and means whereby a blank, also illustrative, may be forced into the die;

Fig. 6 is an elevation of the die shown in Fig. 5;

Figs. 7 and 8 are sections on Fig. 6, taken on the lines 7—7 and 8—8, respectively;

Fig. 9 represents an article partly finished in the die shown in Figs. 5 to 8 inclusive.

The corresponding parts are referred to both in the specification and drawings by similar reference characters.

In the drawings, in Fig. 1, 10 represents a solid body member through which is made an opening 11, in this instance a hexagon. Cuts 12—12—12 are made angularly in the body of the die so as to produce angular cutting edges 201 along each side of the polygonal opening 11, which, in the form illustrated, are arranged so that the cutting edges form a zigzag line around the opening 11 with the alternate apexes at the top of the die. It will be understod, of course, that the opening 11 is preferably made larger at the bottom than at the top so as to produce a draft for clearance on the cutting edges 201, and this draft is arranged in such a way that, in the case of a polygonal opening, for instance, each part of each cutting edge is the correct distance from the axis of the opening 11 irrespective of the distance from the top of the die, so that the edges form a perfect equilateral polygon (as for instance the hexagon illustrated) in the plan view of the die. Likewise, in the case of a circular opening, each part of each cutting edge would be the same distance from the center as all other parts irrespective of its distance below the face of the die.

Fig. 3 illustrates one form of blank which may be passed into the die 10, such blank, in the form illustrated, being a bolt blank 13 having a cylindrical head 14. At the stage illustrated in Fig. 3, the stem of the blank 13 has been passed into the die and then the cylindrical head 14 pressed downward partially into the hexagonal opening 11. The cutting points 15 at the top of the dies shear the metal along alternate edges of the faces forming the hexagon and because of the angular disposition of the cutting edges, the chips are pushed laterally as at 16, 17. But with the angles of the cutting die in the relation shown in Figs. 1 and 2, it will be obvious that on each pair of adjacent faces the chips 16 and 17 are pushed toward each other. This has the effect of maintaining the pressure behind the cutting edges forming these chips until practically all of the surplus metal has been removed from the blank, and as a consequence, there is no tearing of the metal of the faces, which can be readily ironed or polished by a planishing operation if desired. By throwing these chips toward each other, the chip from each cut is supported by the chip from its opposing cut, whereas, if the chips were all thrown in the same direction around the blank, there would be a tendency to tear very shortly after the cutting operation began, because each cutting edge would be removing supporting metal from behind each chip instead of throwing it toward that chip, as is done in the form which I have illustrated.

Moreover, with the cutting edges arranged in opposition in this manner, the blank will not rotate in the die as the cutting progresses. This turning is likely to occur if all of the angularly arranged edges are formed so that the lateral cutting pressures are in the same direction. In the form which I have illustrated, it is obvious that these cutting edges balance each other so that there is no tendency for the blank to rotate. The direction of pressures is indicated by the arrows of Fig. 2.

While preferably I make each pair of adjacent cutting edges balance each other, so far as this rotation is concerned, it is obvious that, so long as there are an equal number of cutting edges tending to turn the blank in one direction, as there are tending to turn it in the opposite direction, no rotation can take place, and this end could be accomplished by having, for instance in the form illustrated, three of the adjacent cutting edges all cutting in the same direction while the three other edges cut in the opposite direction laterally.

The die 20 illustrated in Figs. 6 to 8, inclusive, is also of the solid type and has an opening 21 (hexagonal in the form illustrated) formed in it. Appropriate draft is given to the opening 21 to provide a clearance on the cutting edges formed around the polygonal opening.

The cutting edges in this form of die are given an angular relation to the direction of motion of a blank passed into the die by milling cuts 22 made into the face of the die so as to intersect the edges of the polygonal opening 21. When the milling cuts are made in the manner indicated in Fig. 6, the uppermost point of each cutting edge, as 23, will occur midway between the angles of the polygonal opening 21. If desired, these milling cuts could be made along the broken line as at 24 of Fig. 6, in which case the uppermost points of the cutting edges would occur at the angles of the polygonal opening.

When a blank as 25, having a head such as 26, is forced into the die 20, the first effect will be to cut each face in the manner shown best in Fig. 9, in such a way that a part of the chip formed on each face is thrown toward the adjacent face. With this die, as in the die illustrated in Figs. 1 and 2, the chips from one face tend to support the chip from the adjacent faces, and thus prevent the tearing of the metal. Moreover, in this form of die also the lateral cutting forces are balanced so as to prevent the rotation of the blank in the die.

It will be understood that the form of die illustrated in Figs. 1 and 2 may be substituted for the die 20 illustrated in Fig. 5, and that the blank may be inserted into such dies either head or body foremost.

It will also be understood that, although I have illustrated in Fig. 5, parts which obviously may be moved by machinery, the dies may be used and the method carried out by any other suitable way to force the blank and die together.

In Fig. 5, 27 is a punch which forces the blank 25 into the die and 28 is a punch to force it back again after the end of the blank has passed the cutting edges. In Fig. 7 a blank is shown in dotted position after the head has been finished and when it is about to be returned through the die. If desired, the die and its die holder may be arranged so that the blank will be pushed out of the die in the same direction which it traveled while the head was being cut.

It will be obvious that, by forming the cutting edges of my dies in a solid block, as illustrated, these edges may be readily sharpened by grinding along the milling cuts and across the flat faces of the die, and that, at the same time, the cutting edges are strongly supported and are therefore able to stand greater pressures than would be possible if such cutting edges were on separate pieces held within the die. Moreover, there is no possibility of any loss of adjustment of the cutting edges.

While the method by which the partly finished article shown in Fig. 9 is produced, is effective, I have found that the method by which the partly finished article shown in Fig. 3 is produced is superior, there being less tendency to tear the metal and the edges therefore being formed more sharply, probably due to the fact that the opposing chips being larger, they have a greater tendency to prevent any sudden release of pressure and the consequent tendency to tear the metal of the faces.

It will be understood that dies for producing circular cross sections will be the same as those described, except that the opening will be circular, the cutting edges being formed on this opening in a similar manner, and preferably so that adjacent cutting edges make angles with each other to roll the chips formed by each adjacent pair toward each other.

I claim:

1. The method of giving a trimmed cross section to a blank consisting of simultaneously cutting the blank with a series of angular cutting edges arranged so that the chips from a pair of adjacent cutting edges will be rolled toward each other.

2. The method of giving a polygonal cross section to a blank, consisting of simultaneously cutting each of a pair of adjacent faces from one end of the blank to the other with an angular cut extending across the entire face, so that the chips on the pair of faces are thrown toward each other, with the angular cuts meeting at the edge between the two faces.

3. The method of giving a polygonal cross section to a blank, consisting of simultaneously cutting all of the faces from one end of the blank to the other, by cuts extending angularly across the entire face being formed, the angles of cut on the several faces being such that the line of cut on each face makes an angle with the line of cut on each face adjacent thereto and makes the same angle with the direction of cut as does the line of cut on the faces next but one on either side of the face.

4. A solid die having an opening therein, and cutting edges formed on the sides of the opening, each cutting edge forming an angle with the axis of the opening and one of the cutting edges forming an angle with an adjacent cutting edge.

5. A solid die having an opening therein, and cutting edges formed on the sides of the opening, each cutting edge extending from the top face of the die toward the bottom to form an angle with the top face of the die, and one of the cutting edges forming an angle with an adjacent cutting edge.

6. A die having an opening therein and a plurality of substantially flat surfaces making acute angles with the axis of the opening and intersecting the edges of the opening to form a series of cutting edges in the periphery thereof.

7. A die having an opening therein and a plurality of substantially flat surfaces making acute angles with the axis of the opening and intersecting the edges of the opening to form a series of cutting edges in the periphery thereof, the surfaces joining each other at the periphery of the opening.

8. A die having an opening therein and a plurality of substantially flat surfaces making acute angles with the axis of the opening and intersecting the edges of the opening to form a series of cutting edges in the periphery thereof, each of the surfaces forming an acute angle with the plane passed through the axis of the opening and intersecting the surface at its center line.

9. A die having an opening therein and a plurality of substantially flat surfaces making acute angles with the axis of the opening and intersecting the edges of the opening to form a series of cutting edges in the periphery thereof, the surfaces joining each other at the periphery of the opening, each of the surfaces forming an acute angle with the plane passed through the axis of the opening and intersecting the surface at its center line.

10. A die having an opening therein and a plurality of substantially V-shaped grooves cut into its upper surface, the line of the apex of each groove forming an acute angle with the axis of the opening and the side surfaces of the grooves intersecting the periphery of the opening to form cutting edges thereon.

RICHARD LESTER WILCOX.

Copies of this patent may be obtained for five cents each, by addressing the "Commissioner of Patents, Washington, D. C."